(12) United States Patent
Wood et al.

(10) Patent No.: US 6,245,915 B1
(45) Date of Patent: Jun. 12, 2001

(54) ASYMMETRICAL BISBENZOTRIAZOLES SUBSTITUTED BY A PERFLUOROALKYL MOIETY

(75) Inventors: Mervin Wood, Poughquag; Jacqueline Lau, Jericho; Ramanathan Ravichandran, Nanuet, all of NY (US)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/550,724

(22) Filed: Apr. 17, 2000

Related U.S. Application Data

(63) Continuation-in-part of application No. 09/303,583, filed on May 3, 1999.

(51) Int. Cl.$^7$ .................................................. C07D 249/20
(52) U.S. Cl. ........................ 548/259; 524/90; 544/132; 544/366; 546/199; 548/260; 548/261
(58) Field of Search ..................... 548/259, 260, 548/261; 544/132, 300; 546/199

(56) References Cited

U.S. PATENT DOCUMENTS

| | | | |
|---|---|---|---|
| 3,004,896 | 10/1961 | Heller et al. | 167/90 |
| 3,055,896 | 9/1962 | Boyle et al. | 260/249.5 |
| 3,072,585 | 1/1963 | Milionis et al. | 260/22 |
| 3,074,910 | 1/1963 | Dickson, Jr. | 260/45.75 |
| 3,189,615 | 6/1965 | Heller et al. | 260/308 |
| 3,218,332 | 11/1965 | Heller et al. | 260/308 |
| 3,230,194 | 1/1966 | Boyle | 260/45.8 |
| 3,290,203 | 12/1966 | Antonson et al. | 161/4 |
| 3,629,191 | 12/1971 | Heller et al. | 524/91 |
| 3,681,179 | 8/1972 | Theissen | 161/4 |
| 3,776,805 | 12/1973 | Hansen | 161/2 |
| 3,823,112 | 7/1974 | Ponder | 524/91 |
| 3,992,339 | 11/1976 | Harlan, Jr. et al. | 524/91 |
| 4,095,013 | 6/1978 | Burger | 428/522 |
| 4,127,586 | 11/1978 | Rody et al. | 260/308 |
| 4,206,111 | 6/1980 | Valdiserri et al. | 524/91 |
| 4,226,763 | 10/1980 | Dexter et al. | 260/45.8 |
| 4,278,589 | 7/1981 | Dexter et al. | 260/45.8 |
| 4,278,590 | 7/1981 | Dexter et al. | 524/91 |
| 4,315,848 | 2/1982 | Dexter et al. | 260/45.8 |
| 4,383,863 | 5/1983 | Dexter et al. | 106/125 |
| 4,645,714 | 2/1987 | Roche et al. | 428/458 |
| 4,657,803 | 4/1987 | Pernicano | 428/200 |
| 4,675,352 | 6/1987 | Winter et al. | 524/91 |
| 4,681,905 | 7/1987 | Kubota et al. | 524/91 |
| 4,684,680 | 8/1987 | Kubota et al. | 524/91 |
| 4,760,148 | 7/1988 | Seltzer et al. | 524/91 |
| 4,776,913 | 10/1988 | Goossens et al. | 156/230 |
| 4,853,471 | 8/1989 | Rody et al. | 548/261 |
| 4,871,784 | 10/1989 | Otonari et al. | 521/138 |
| 4,891,396 | 1/1990 | Avar et al. | 524/91 |
| 5,001,177 | 3/1991 | Winfried et al. | 524/91 |
| 5,032,498 | 7/1991 | Rody et al. | 524/91 |
| 5,095,062 | 3/1992 | Winter et al. | 524/91 |
| 5,160,787 | 11/1992 | Gako et al. | 428/91 |

(List continued on next page.)

FOREIGN PATENT DOCUMENTS

| | | | |
|---|---|---|---|
| 0191582 | * 8/1986 | (EP) | 548/261 |
| 0355962 | 2/1990 | (EP) . | |
| 0752612 | 1/1997 | (EP) . | |
| 2012668 | 8/1979 | (GB) . | |
| 177072 | 9/1985 | (JP) . | |
| 158752 | 7/1987 | (JP) . | |
| 22849 | 1/1988 | (JP) . | |
| 51542 | 2/1990 | (JP) . | |
| 95003217 | 1/1995 | (JP) . | |
| 96143831 | 6/1996 | (JP) . | |
| 92/01557 | 2/1992 | (WO) . | |
| 97/32225 | 9/1997 | (WO) . | |
| 97/42261 | 11/1997 | (WO) . | |
| 98/34981 | 8/1998 | (WO) . | |

OTHER PUBLICATIONS

Derwent Abstr. 94–238171[29].

Derwent Abstr. 92–145092/18.

Derwent Abstr. 96–074587/08.

Derwent Abstr. 92–295231/36.

Derwent Abstr. 91991 D/50.

Derwent Abstr. 93–400473/50.

Derwent Abstr. 84117X/45.

Derwent Abstr. 95–078227/11.

Derwent Abstr. 92–295510/36.

Nagashima et al., Journal of Non–Crystalline Solids, 178, (1994), pp. 182–188.

Primary Examiner—Floyd D. Higel
(74) Attorney, Agent, or Firm—Luther A. R. Hall

(57) ABSTRACT

Asymmetrical bis benzotriazoles of the formula I

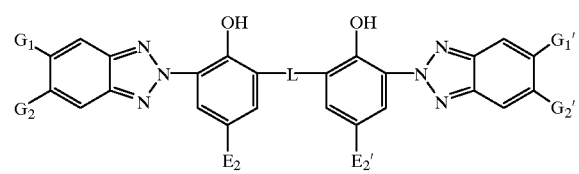

where $G_2'$ is perfluoroalkyl of 1 to 12 carbon atoms, preferably $CF_3$, and where $G_2$ does not contain said group are red-shifted and due to the asymmetry are particularly soluble and useful in a host of applications including automotive coatings, thermoplastics and especially in adhesive compositions, themselves useful in solar panels and other laminate structures.

4 Claims, No Drawings

U.S. PATENT DOCUMENTS

| | | | |
|---|---|---|---|
| 5,166,355 | * 11/1992 | Leistner et al. | 548/260 |
| 5,204,390 | 4/1993 | Szymansky et al. | 524/91 |
| 5,217,794 | 6/1993 | Schrenk | 428/220 |
| 5,229,521 | * 7/1993 | Luisoli et al. | 548/260 |
| 5,239,406 | 8/1993 | Lynam | 359/275 |
| 5,268,450 | 12/1993 | DesLauriers et al. | 528/388 |
| 5,278,314 | 1/1994 | Winter et al. | 548/259 |
| 5,280,124 | 1/1994 | Winter et al. | 548/259 |
| 5,292,890 | * 3/1994 | Moshchitsky et al. | 546/261 |
| 5,294,473 | 3/1994 | Kawamoto | 428/141 |
| 5,319,091 | 6/1994 | DesLauriers et al. | 548/259 |
| 5,360,850 | 11/1994 | Moshchitsky et al. | 524/91 |
| 5,372,889 | 12/1994 | Harisiades et al. | 428/429 |
| 5,387,458 | 2/1995 | Pavelka et al. | 428/141 |
| 5,410,071 | 4/1995 | DesLauriers et al. | 548/259 |
| 5,426,204 | 6/1995 | Harisiades et al. | 556/419 |
| 5,436,349 | 7/1995 | Winter et al. | 548/259 |
| 5,488,112 | * 1/1996 | Beinehr et al. | 548/261 |
| 5,516,914 | 5/1996 | Winter et al. | 548/259 |
| 5,523,877 | 6/1996 | Lynam | 359/275 |
| 5,564,843 | 10/1996 | Kawaguchi | 400/208 |
| 5,607,987 | 3/1997 | Winter et al. | 524/91 |
| 5,618,626 | 4/1997 | Nagashima et al. | 428/429 |
| 5,618,863 | 4/1997 | D'Errico et al. | 524/91 |
| 5,643,676 | 7/1997 | Dobashi et al. | 428/411.1 |
| 5,683,804 | 11/1997 | Nagashima et al. | 428/336 |
| 5,770,114 | 6/1998 | Byker et al. | 252/583 |
| 5,926,248 | 7/1999 | Tucker | 351/44 |
| 5,977,219 | 11/1999 | Ravichandran et al. | 524/91 |
| 6,040,455 | 3/2000 | Wood et al. | 548/259 |
| 6,084,104 | * 7/2000 | Nakano et al. | 548/259 |

* cited by examiner

ASYMMETRICAL BISBENZOTRIAZOLES SUBSTITUTED BY A PERFLUOROALKYL MOIETY

This is a continuation-in-part of application Ser. No. 09/303,583, filed on May 3, 1999, claims allowed and issue fee paid.

The instant invention pertains to novel asymmetrical bisbenzotriazole compounds which are red-shifted, are particularly soluble due to that asymmetry and which are useful in a host of end-use applications.

BACKGOUND OF THE INVENTION

Although benzotriazoles with just hydrogen at the 5-position of the benzo ring are photostable and useful in adhesive formulations, they lack red-shifted absorbance toward longer UV wavelengths which would make them more useful in giving added protection to the substrates. U.S. Pat. No. 5,319,091 and U.S. Pat. No. 5,410,071 described the preparation of benzotriazoles substituted at the 5-position of the benzo ring with alkyl- or aryl-sulfonyl moieties. It is taught in U.S. Pat. No. 5,280,124 that by introducing a higher alkyl or aryl sulfoxide or sulfone at the 5-position of the benzo ring of the benzotriazole, the resulting benzotriazole exhibits enhanced absorption in the near visible range (over 350 nm). Such sulfone substituted products were shown to be useful in automotive coatings applications. Copending patent applications Ser. Nos. 08/961,127 and 09/234,880 teach that an electron withdrawing moiety at the 5-position of the benzo ring of the benzotriazole is advantageous for similar reasons. Additionally, these copending patent applications teach that such an electron withdrawing group dramatically increases the photostability of these benzotriazole UV absorbers in automotive coatings.

It is known in the art that the concomitant use of a hindered amine light stabilizer with a UV absorber such as a benzotriazole provides excellent stabilization in many polymer compositions as summarized by G. Berner and M. Rembold, "New Light Stabilizers for High Solids Coatings", Organic Coatings and Science and Technology, Vol. 6, Dekkar, New York, pp 55–85.

The benzotriazole UV absorbers represent a special class of commercial UV absorbers as described above. Only a few references refer to substitution on the benzo ring by an aryl or alkyl sulfoxide or sulfonyl moiety. U.S. Pat. No. 3,218,332 discloses benzotriazoles substituted at the 5-position of the benzo ring by a lower alkyl sulfonyl moiety. However, this patent deals with putting reactable groups, namely alkenyl groups, at the 3-position on the phenyl ring and is of little relevance to the instant application. U.S. Pat. No. 5,268,450 and U.S. Pat. No. 5,319,091 disclose polymer compositions and a process for the production of substituted aryl thio and aryl sulfonyl benzotriazoles which are covalently bound to polymers, such as poly(phenylene sulfide), RYTON®, Phillips Petroleum. U.S. Pat. No. 5,280,124 discloses benzotriazoles with only higher alkyl or aryl sulfinyl or sulfonyl moieties at the 5-position of the benzo ring which are useful for protecting thermoset automotive coatings. The copending patent applications mentioned above teach the use of certain electron withdrawing groups including some sulfonyl groups at the 5-position of the benzo ring for the stabilization of automotive coatings.

Japanese Patent No. 92-352228 discloses the use of 5-ethylsulfonyl benzotriazoles with the 3-position of the phenyl ring being unsubstituted or substituted by methyl for the UV protection of dust proof poly(vinyl chloride) resin films. These compounds when studied in the instant adhesive compositions were found to be quite insoluble and totally useless for the instant adhesive compositions. By contrast, when a tertiary alkyl group is inserted at the 3-position of the phenyl ring, the solubility of the thus substituted benzotriazole in adhesive composition is surprisingly enhanced.

The instant compounds exhibit enhanced broadened absorption characteristics particularly in the long wavelength UV region (over 350 nm) when compared with compounds of the prior art. Additionally, the instant compounds have surprising and unexpectedly high solubility in adhesives making them especially well suited for use in adhesive formulations.

The effect of UV light on laminated articles that are exposed to the sun or other sources of UV light are of great concern to the manufacturers of such articles. Over time, constant or repeated exposure to UV light can result in dye and/or pigment fade for dyes and/or pigments used in such articles and in the degradation or breakdown of the adhesives, polymers or other materials used in the construction of the articles. The aforementioned fading and degradation shorten the useful life of the articles in question, making protection from UV light exposure an issue of great importance to the manufacturers of such articles.

Molecules known as UV absorbers are generally known in the art. However, due to the differences discussed above between the various UV absorber classes, it is the benzotriazoles and articles containing them which will be discussed here. Due to the incompatibility and low solubility of certain benzotriazoles, a need exists for selected benzotriazoles that are highly soluble and which would provide added protection in the 350 to 400 nm region of the ultraviolet. T. Nagashima et al., J. Non-Cryst. Solids, 178 (1994), 182, report "Recently ultraviolet light (UV) shielding glass, which is UV absorbing over the range of long wavelengths (320–400 nm) to avoid sunburn effects, has become an important issue because of the possible hazard of skin cancer due to depletion of the ozone layer."

In addition, articles which incorporate the selected benzotriazoles of the instant invention are useful in protecting interior structures, textiles and fabrics from UV induced photodegradation such as in automotive applications.

Bisbenzotriazoles such as 2,2'-methylene-bis[4-tert-octyl-6-(2H-benzotriazolyl-2-yl)phenol], TINUVIN® 360 (Ciba) are are described in U.S. Pat. No. 5,299,521. While useful, these compounds are not red-shifted.

German 1,670,951 describes generically both symmetrical and asymmetrical alkylene-bisbenzotriazoles, but specifically only some symmetical bisbenzotriazoles which are outside of the scope of the instant claims. None of the compounds described in German 1,670,951 are substituted by a perfluroalkyl moiety, such as by $CF_3$, and as is -seen in instant Example 6, these symmetrical bisbenzotriazoles are insoluble in adhesive compositions.

U.S. Pat. No. 4,812,498 describes symmetrical bisbenzotriazoles as stabilizers for polycarbonate resins. The bisbenzotriazoles are symmetrical in structure, do not contain perfluoroalkyl moieties, and are clearly outside the scope of the instant compounds.

EP 924,203 A1 describes bisbenzotriazole compounds each containing a polymerizable moiety and polymers made therefrom. None of these prior art bisbenzotriazoles is red-shifted or contains a perfluoroalkyl group. The instant compounds are clearly distinguished from these prior bisbenzotriazoles.

U.S. Pat. No. 5,977,219, British patent application 2,319,035, copending application Ser. Nos. 09/234,880 and 09/303,583 all describe both symmetrical and asymmetrical red-shifted bisbenzotriazoles. Quite surprisingly, these red-shifted benzotriazoles are amazingly soluble in adhesives making them especially well-suited for the instant applications. Copending application Ser. No. 09/234,880 also teaches symmetrical bisbenzotriazoles which are substituted on the both benzo rings by a perfluoroalkyl moiety and asymmetrical bisbenzotriazoles which is substituted on one benzo ring by a perfluoroalkyl moiety and where the other benzo ring is unsubstituted. There is a clear line of demarcation between the instant bisbenzotriazoles are also asymmetrical but where one benzo ring is subsituted by a perfluoroalkyl moiety, and the other benzo ring is substituted by a different electron withdrawing moiety.

DETAILED DISCLOSURE

The instant invention pertains to compounds of formula I

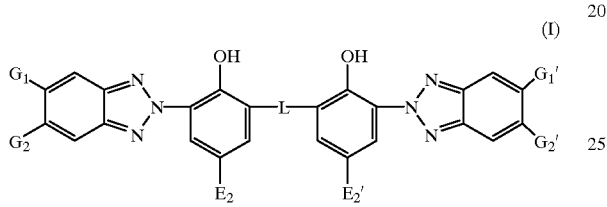

(I)

wherein $G_1$ and $G_1'$ are independently hydrogen or halogen;

$G_2$ is halogen, nitro, cyano, —$COOG_3$, —$P(O)(C_6H_5)_2$, —CO—$G_3$, —CO—NH—$G_3$, —CO—N($G_3$)$_2$, —N($G_3$)—CO—$G_3$, $E_3$S—, $E_3$SO— or $E_3SO_2$—;

$G_2'$ is perfluoroalkyl of 1 to 12 carbon atoms;

$G_3$ is hydrogen, straight or branched chain alkyl of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 4 alkyl of 1 to 4 carbon atoms;

$E_2$ and $E_2'$ are independently straight or branched alkyl chain of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by one to three alkyl of 1 to 4 carbon atoms; or $E_2$ and $E_2'$ are independently said alkyl of 1 to 24 carbon atoms or said alkenyl of 2 to 18 carbon atoms substituted by one or more —OH, —OCOE$_{11}$, —OE$_4$, —NCO, —NH$_2$, —NHCOE$_{11}$, —NHE$_4$ or —N(E$_4$)$_2$, or mixtures thereof, where E$_4$ is straight or branched chain alkyl of 1 to 24 carbon atoms; or said alkyl or said alkenyl interrupted by one or more —O—, —NH— or —NE$_4$— groups or mixtures thereof and which can be unsubstituted or substituted by one or more —OH, —OE$_4$ or —NH$_2$ groups or mixtures thereof; or $E_2$ and $E_2'$ are independently —(CH$_2$)$_m$—CO—E$_5$; or $E_2$ and $E_2'$ are independently a group of the formnula

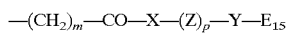

wherein $E_5$ is —OE$_6$ or —NE$_7$E$_8$, or $E_5$ is —PO(OE$_{12}$)$_2$, —OSi(E$_{11}$)$_3$ or —OCO—E$_{11}$, or straight or branched chain C$_1$–C$_{24}$alkyl which is interrupted by —O—, —S— or —NE$_{11}$ and which can be unsubstituted or substituted by —OH or —OCO—E$_{11}$, C$_5$–C$_{12}$ cycloalkyl which is unsubstituted or substituted by —OH, straight chain or branched C$_2$–C$_{18}$alkenyl which is unsubstituted or substituted by —OH, C$_7$–C$_{15}$aralkyl, —CH$_2$—CHOH—E$_{13}$ or glycidyl, $E_6$ is hydrogen, straight or branched chain C$_1$–C$_{24}$alkyl which is unsubstituted or substituted by one or more OH, OE$_4$ or NH$_2$ groups, or —OE$_6$ is —(OCH$_2$CH$_2$)$_w$OH or —(OCH$_2$CH$_2$)$_w$OE$_{21}$ where w is 1 to 12 and E$_{21}$ is alkyl of 1 to 12 carbon atoms, $E_7$ and $E_8$ are independently hydrogen, alkyl of 1 to 18 carbon atoms, straight or branched chain C$_3$–C$_{18}$alkyl which is interrupted by —O—, —S— or —NE$_{11}$—, C$_5$–C$_{12}$cycloalkyl, C$_6$–C$_{14}$aryl or C$_1$–C$_3$hydroxylalkyl, or $E_7$ and $E_8$ together with the N atom are a pyrrolidine, piperidine, piperazine or morpholine ring, X is —O— or —N(E$_{16}$)—, Y is —O— or —N(E$_{17}$)—, Z is C$_2$–C$_{12}$-alkylene, C$_4$–C$_{12}$-alkylene interrupted by one to three nitrogen atoms, oxygen atoms or a mixture thereof, or is C$_3$–C$_{12}$-alkylene, butenylene, butynylene, cyclohexylene or phenylene, each substituted by a hydroxyl group, m is zero, 1 or 2, p is 1, or p is also zero when X and Y are —N(E$_{16}$)— and —N(E$_{17}$)—, respectively, $E_{15}$ is a group —CO—C(E$_{18}$)═C(H)E$_{19}$ or, when Y is —N(E$_{17}$)—, forms together with E$_{17}$ a group —CO—CH═CH—CO—, wherein E$_{18}$ is hydrogen or methyl, and E$_{19}$ is hydrogen, methyl or —CO—X—E$_{20}$, wherein E$_{20}$ is hydrogen or C$_1$–C$_{18}$-alkyl;

$E_{16}$ and $E_{17}$ independently of one another are hydrogen, C$_1$–C$_{18}$-alkyl, C$_3$–C$_{12}$-alkyl interrupted by 1 to 3 oxygen atoms, or is cyclohexyl or C$_7$–C$_{15}$aralkyl, and $E_{16}$ together with E$_{17}$ in the case where Z is ethylene, also forms ethylene, $E_{11}$ is hydrogen, straight or branched chain C$_1$–C$_{18}$alkyl, C$_5$–C$_{12}$cycloalkyl, straight or branched chain C$_2$–C$_{18}$alkenyl, C$_6$–C$_{14}$aryl or C$_7$–C$_{15}$aralkyl;

$E_{12}$ is straight or branched chain C$_1$–C$_{18}$alkyl, straight or branched chain C$_3$–C$_{18}$alkenyl, C$_5$–C$_{10}$cycloalkyl, C$_6$–C$_{16}$aryl or C$_7$–C$_{15}$aralkyl;

$E_{13}$ is hydrogen, straight chain or branched C$_1$–C$_{18}$alkyl which is substituted by —PO(OE$_{12}$)$_2$, phenyl which is unsubstituted or substituted by OH, C$_7$–C$_{15}$aralkyl or —CH$_2$OE$_{12}$;

$E_3$ is alkyl of 1 to 20 carbon atoms, hydroxyalkyl of 2 to 20 carbon atoms, alkyl substituted by alkoxycarbonyl of 2 to 9 carbon atoms, alkenyl of 3 to 18 carbon atoms, cycloalkyl of 5 to 12 carbon atoms, phenylalkyl of 7 to 15 carbon atoms, aryl of 6 to 10 carbon atoms or said aryl substituted by one or two alkyl of 1 to 4 carbon atoms or 1,1,2,2-tetrahydroperfluoroalkyl where the perfluoroalkyl moiety is of 6 to 16 carbon atoms; and L is alkylene of 1 to 12 carbon atoms, alkylidene of 2 to 12 carbon atoms, benzylidene, p-xylylene, α,α,α',α'-tetramethyl-m-xylylene or cycloalkylidene.

Preferably, $G_1$ and $G_1'$ are each hydrogen, $G_2$ is chloro, phenylsulfonyl or phenylthio, $G_2'$ is CF$_3$, $E_2$ and $E_2'$ are independently straight or branched alkyl chain of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 3 alkyl of 1 to 4 carbon atoms; and L is alkylene of 1 to 12 carbon atoms, alkylidene of 2 to 12 carbon atoms, benzylidene, p-xylylene, $\alpha,\alpha,\alpha',\alpha'$-tetramethyl-m-xylylene or cycloalkylidene.

Most preferably, $G_1$ and $G_1'$ are each hydrogen, $G_2$ is chloro, phenylsulfonyl or phenylthio, $G_2'$ is $CF_3$, $E_2$ and $E_2'$ are independently straight or branched alkyl chain of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 3 alkyl of 1 to 4 carbon atoms; and L is methylene.

The instant invention also pertains to a stabilized adhesive composition, suitable for use as an adhesive layer in a laminated article or multilayer construction, which comprises (a) an adhesive; and (b) an effective stabilizing amount of a highly soluble, red-shifted, photostable benzotriazole of formula I.

The effective stabilizing amount of a benzotriazole of formula I is 0.1 to 20% by weight based on the adhesive.

The adhesive of component (a) is selected from the group consisting of the pressure sensitive adhesives, the rubber-based adhesives, the solvent or emulsion based adhesives, the hot melt adhesives and natural-product based adhesives.

The adhesive composition is present in a la minated or multilayer construction selected from the group consisting of (a) retroreflective sheets and signs and conformable marketing sheets;

(b) solar control films of various construction;

(c) corrosion resistant silver mirrors and solar reflectors;

(d) reflective print labels;

(e) UV absorbing glasses and glass coatings;

(f) electrochromic devices;

(g) films/glazings;

(h) windscreens and intermediate layers; and (i) optical films.

The adhesive of component (a) in the adhesive composition is a resin selected from the group consisting of (i) polyurethanes;

(ii) polyacrylics;

(iii) epoxys;

(iv) phenolics;

(v) polyimides;

(vi) poly(vinyl butyral);

(vii) polycyanoacrylates;

(viii) polyacrylates;

(ix) ethylene/acrylic acid copolymers and their salts (ionomers);

(x) silicon polymers;

(xi) poly(ethylene/vinyl acetate);

(xii) atatic polypropylene;

(xiii) styrene-diene copolymers;

(xiv) polyamides;

(xv) hydroxyl-terminated polybutadiene;

(xvi) polychloroprene;

(xvii) poly(vinyl acetate);

(xviii) carboxylated styrene/butadiene copolymers;

(xix) poly(vinyl alcohol); and (xx) polyesters.

Preferably the resin is selected from the group consisting of the polyurethanes, acrylics, epoxy resins, phenolics, polyimides, poly(vinyl butyral), polyolefins, polyacrylates, thermosets, vinyl polymers, styrene polymers and cyanoacrylates.

The adhesive composition may additionally contain from 0.1 to 10% by weight based on the adhesive of a coadditive which is selected from the group consisting of the antioxidants, other UV absorbers, hindered amines, phosphites or phosphonites, hydroxylamines, nitrones, benzofuran-2-ones, thiosynergists, polyamide stabilizers, metal stearates, nucleating agents, fillers, reinforcing agents, lubricants, emulsifiers, dyes, pigments, optical brighteners, flame retardants, antistatic agents and blowing agents; where the amount of coadditive is from 0.025 to 5% by weight based on the adhesive.

The instant invention also pertains to a composition stabilized against thermal, oxidative or light-induced degradation which comprises, (a) an organic material subject to thermal, oxidative or light-induced degradation, and (b) an effective stabilizing amount of a compound of formula I.

Preferably, the organic material is a natural, semi-synthetic or synthetic polymer, especially a thermoplastic polymer.

Most preferably, the polymer is a polyolefin or polycarbonate, especially polyethylene or polypropylene; most especially polypropylene; or the polymer is a styrenic, ABS, a nylon, a polyester such as poly(ethylene terephthalate) or poly(butylene terephthalate), a polyurethane, an acrylate, a rubber modified styrenic, poly (vinyl chloride), poly(vinyl butyral), polyacetal (polyoxymethylene), poly(ethylene naphthalenedicarboxylate), or other blends or copolymers such as poly(ethylene/1,4-cyclohexylenedimethylene terephthalate) PETG or an ionomer.

In another preferred embodiment of the instant invention, the organic material is a resin selected from the group consisting of a thermoset acrylic melamine resin, an acrylic urethane resin, an epoxy carboxy resin, a silane modified acrylic melamine, an acrylic resin with carbamate pendant groups crosslinked with melamine or an acrylic polyol resin crosslinked with melamine containing carbamate groups.

Most preferably, the resin is a thermoset acrylic melamine resin or an acrylic urethane resin.

In yet another preferred embodiment of the instant invention, the organic material is a recording material.

The recording materials according to the invention are suitable for pressure-sensitive copying systems, photocopying systems using microcapsules, heat-sensitive copying systems, photographic materials and ink jet printing.

The recording materials according to the invention are distinguished by an unexpected improvement in quality, especially with regard to the fastness to light.

The recording materials according to the invention have the construction known for the particular use. They consist of a customary carrier, for example, paper or plastic film, which has been coated with one or more layers. Depending on the type of material, these layers contain the appropriate necessary components, in the case of photographic materials, for example, silver halide emulsions, dye couplers, dyes and the like. Material particularly suitable for ink jet printing has a layer particularly absorptive for ink on a customary carrier. Uncoated paper can also be employed for ink jet printing. In this case the paper acts at the same time as the carrier material and as the ink-absorbent layer. Suitable material for ink jet printing is, for example, described in U.S. Pat. No. 5,073,448 which is incorporated herein by reference.

The recording material can also be transparent as, for example, in the case of projection films.

The compounds of formula I can be incorporated into the carder material as early as the production of the latter, in the production of paper, for example, being added to the paper pulp. A second method of application is to spray the carder material with an aqueous solution of compounds of formula I or to add the compounds to the coating composition.

Coating compositions intended for transparent recording materials suitable for projection cannot contain any particles which scatter light, such as pigments and fillers.

The dye-binding coating composition can contain a number of other additives, for example, antioxidants, light stabilizers (including also UV absorbers which do not fall under the scope of the UV absorbers of this invention), viscosity improvers, fluorescent brighteners, biocides and/or antistatic agents.

The coating composition is usually prepared as follows: the water-soluble components, for example, the binder, are dissolved in water and stirred together; the solid components, for example, fillers and other additives already described, are dispersed in this aqueous medium; and disperison is advantageously carried out by means of devices, for example, ultrasonic systems, turbine stirrers, homogenizers, colloid mills, bead mills, sand mills, high-speed stirrers and the like. The compounds of formula I can be easily incorporated into the coating composition.

The recording material according to this invention preferably contains 1 to 5000 mg/m$^2$, in particular 50–1200 mg/m$^2$, of a compound of formula I.

As already mentioned, the recording materials according to the invention embrace a wide field. The compounds of formula I can, for example, be employed in pressure-sensitive copying systems. They can be introduced either into the paper in order to protect the microencapsulated dye precursors there from light, or into the binder of the developer layer in order to protect the dyes formed there.

Photocopying systems using light-sensitive microcapsules which are developed by means of pressure are described in U.S. Pat. Nos. 4,416,966; 4,483,912; 4,352,200; 4,535,050; 4,535,463; 4,551,407; 4,562,137 and U.S. Pat. No. 4,608,330; and also in EP-A 139,479; EP-A 162,664; EP-A 164,931; EP-A 237,024; EP-A 237,025 and EP-A 260,129. In all these systems, the compounds can be put into the dye-receiving layer. The compounds can, however, also be put into the donor layer in order to protect the color formers from light.

Photographic materials which can be stabilized are photographic dyes and layers containing such dyes or precursors thereof, for example, photographic paper and films. Suitable materials are, for example, described in U.S. Pat. No. 5,364,749 which is incorporated herein by reference. The compounds of formula I act here as a UV filter against electrostatic flashes. In color photographic materials, couplers and dyes are also protected against photochemical decomposition.

The instant compounds can be used for all types of color photographic materials. For example, they can be employed for color paper, color reversal paper, direct-positive color material, color negative film, color positive film, color reversal film and the like. They are preferably used inter alia for photographic color material which contains a reversal substrate or form positives.

Color-photographic recording materials usually contain, on a support, a blue-sensitive and/or a green-sensitive and/or a red-sensitive silver halide emulsion layer and, if desired, a protection layer, with the instant compounds being, preferably, either in the green-sensitive or the red-sensitive layer or in a layer between the green-sensitive and the red-sensitive layer or in a layer on top of the silver halide emulsion layers.

The compounds of formula I can also be employed in recording materials based on the principles of photopolymerization, photoplasticization or the rupture of microcapsules, or in cases where heat-sensitive and light-sensitive diazonium salts, leuko dyes having an oxidizing agent or dye lactones having Lewis acids are used.

Furthermore, the instant compounds can be employed in recording materials for dye diffusion transfer printing, thermal wax transfer printing and non-matrix printing and for use with electrostatic, electrographic, electrophoretic, magnetographic and laser-electrophotographic printers and pen-plotters. Of the above, recording materials for dye diffusion transfer printing are preferred, for example, as described in EP-A 507,734.

The instant compounds can also be employed in inks, preferably for ink jet printing, for example, as described in U.S. Pat. No. 5,098,477 which is incorporated herein by reference.

The compounds of this invention exhibit superior hydrolytic stability, handling and storage stability as well as good resistance to extractability when present in a stabilized composition.

The methodology to make the instant compounds is described in the prior art. The intermediates needed to make the instant compounds are largely items of commerce.

In general polymers which can be stabilized include

1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), low density polyethylene (LDPE), linear low density polyethylene (LLDPE), branched low density polyethylene (BLDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).

b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, Ia and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$–$C_9$) including hydrogenated modifications thereof (e.g. tackifiers) and mixtures of polyalkylenes and starch.

5. Polystyrene, poly(p-methylstyrene), poly($\alpha$-methylstyrene).

6. Copolymers of styrene or $\alpha$-methylstyrene with dienes or acrylic derivatives, for example styrene/butadiene, styrene/acrylonitrile, styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

7. Graft copolymers of styrene or $\alpha$-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from $\alpha,\beta$-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate and polyhydroxybenzoates, as well as block copolyether esters derived from hydroxyl-terminated polyethers; and also polyesters modified with polycarbonates or MBS.

19. Polycarbonates and polyester carbonates.

20. Polysulfones, polyether sulfones and polyether ketones.

21. Crosslinked polymers derived from aldehydes on the one hand and phenols, ureas and melamines on the other hand, such as phenol/formaldehyde resins, urea/formaldehyde resins and melamine/formaldehyde resins.
22. Drying and non-drying alkyd resins.
23. Unsaturated polyester resins derived from copolyesters of saturated and unsaturated dicarboxylic acids with polyhydric alcohols and vinyl compounds as crosslinking agents, and also halogen-containing modifications thereof of low flammability.
24. Crosslinkable acrylic resins derived from substituted acrylates, for example epoxy acrylates, urethane acrylates or polyester acrylates.
25. Alkyd resins, polyester resins and acrylate resins crosslinked with melamine resins, urea resins, polyisocyanates or epoxy resins.
26. Crosslinked epoxy resins derived from polyepoxides, for example from bisglycidyl ethers or from cycloaliphatic diepoxides.
27. Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.
28. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO.
29. Naturally occurring and synthetic organic materials which are pure monomeric compounds or mixtures of such compounds, for example mineral oils, animal and vegetable fats, oil and waxes, or oils, fats and waxes based on synthetic esters (e.g. phthalates, adipates, phosphates or trimellitates) and also mixtures of synthetic esters with mineral oils in any weight ratios, typically those used as spinning compositions, as well as aqueous emulsions of such materials.
30. Aqueous emulsions of natural or synthetic rubber, e.g. natural latex or latices of carboxylated styrene/butadiene copolymers.
31. Polysiloxanes such as the soft, hydrophilic polysiloxanes described, for example, in U.S. Pat. No. 4,259,467; and the hard polyorganosiloxanes described, for example, in U.S. Pat. No. 4,355,147.
32. Polyketimines in combination with unsaturated acrylic polyacetoacetate resins or with unsaturated acrylic resins. The unsaturated acrylic resins include the urethane acrylates, polyether acrylates, vinyl or acryl copolymers with pendant unsaturated groups and the acrylated melamines. The polyketimines are prepared from polyamines and ketones in the presence of an acid catalyst.
33. Radiation curable compositions containing ethylenically unsaturated monomers or oligomers and a polyunsaturated aliphatic oligomer.
34. Epoxymelamine resins such as light-stable epoxy resins crosslinked by an epoxy functional coetherified high solids melamine resin such as LSE-4103 (Monsanto).

In general, the compounds of the present invention are employed in from about 0.01 to about 5% by weight of the stabilized composition, although this will vary with the particular substrate and application. An advantageous range is from about 0.05 to about 3%, and especially 0.05 to about 1%. However, some high performance films or in UV absorbing layers of laminates such as those produced by coextrusion may contain from 5–15% by weight of the instant compounds. Concentrations of 5–10% by weight are typical in certain coextrusion applications.

The stabilizers of the instant invention may readily be incorporated into the organic polymers by conventional techniques, at any convenient stage prior to the manufacture of shaped articles therefrom. For example, the stabilizer may be mixed with the polymer in dry powder form, or a suspension or emulsion of the stabilizer may be mixed with a solution, suspension, or emulsion of the polymer. The resulting stabilized polymer compositions of the invention may optionally also contain from about 0.01 to about 5%, preferably from about 0.025 to about 2%, and especially from about 0.1 to about 1% by weight of various conventional additives, such as the materials listed below, or mixtures thereof.

1. Antioxidants
1.1. Alkylated Monophenols, for Example,
2,6-di-tert-butyl-4-methylphenol
2-tert-butyl-4,6-dimethylphenol
2,6-di-tert-butyl-4-ethylphenol
2,6-di-tert-butyl-4-n-butylphenol
2,6-di-tert-butyl-4-i-butylphenol
2,6-di-cyclopentyl-4-methylphenol
2-(α-methylcyclohexyl)-4,6-dimethylphenol
2,6-di-octadecyl-4-methylphenol
2,4,6-tri-cyclohexylphenol
2,6-di-tert-butyl-4-methoxymethylphenol
1.2. Alkylated Hydroquinones, for Example,
2,6-di-tert-butyl-4-methoxyphenol
2,5-di-tert-butyl-hydroquinone
2,5-di-tert-amyl-hydroquinone
2,6-diphenyl-4-octadecyloxyphenol
1.3. Hydroxylated Thiodiphenyl Ethers, for Example,
2,2'-thio-bis-(6-tert-butyl-4-methylphenol)
2,2'-thio-bis-(4-octylphenol)
4,4'-thio-bis-(6-tert-butyl-3-methylphenol)
4,4'-thio-bis-(6-tert-butyl-2-methylphenol)
1.4. Alkylidene-bisphenols, for Example,
2,2'-methylene-bis-(6-tert-butyl-4-methylphenol)
2,2'-methylene-bis-(6-tert-butyl-4-ethylphenol)
2,2'-methylene-bis-[4-methyl-6-(α-methylcyclohexyl)-phenol]
2,2'-methylene-bis-(4-methyl-6-cyclohexylphenol)
2,2'-methylene-bis-(6-nonyl-4-methylphenol)
2,2'-methylene-bis-[6-(α-methylbenzyl)-4-nonylphenol]
2,2'-methylene-bis-[6-(α,α-dimethylbenzyl)-4-nonylphenol]
2,2'-methylene-bis-(4,6-di-tert-butylphenol)
2,2'-ethylidene-bis-(4,6-di-tert-butylphenol)
2,2'-ethylidene-bis-(6-tert-butyl-4-isobutylphenol)
4,4'-methylene-bis-(2,6-di-tert-butylphenol)
4,4'-methylene-bis-(6-tert-butyl-2-methylphenol)
1,1-bis-(5-tert-butyl-4-hydroxy-2-methylphenyl)-butane
2,6-di-(3-tert-butyl-5-methyl-2-hydroxybenzyl)-4-methylphenol
1,1,3-tris-(5-tert-butyl-4-hydroxy-2-methylphenyl)-butane
1,1-bis-(5-tert-butyl-4-hydroxy-2-methylphenyl)-3-n-dodecylmercaptobutane ethyleneglycol bis-[3,3-bis-(3'-tert-butyl-4'-hydroxyphenyl)-butyrate]
di-(3-tert-butyl-4-hydroxy-5-methylphenyl)-dicyclopentadiene
di-[2-(3'-tert-butyl-2'-hydroxy-5'-methyl-benzyl)-6-tert-butyl-4-methylphenyl]terephthalate.
1.5. Benzyl Compounds, for Example,
1,3,5-tri-(3,5-di-tert-butyl-4-hydroxybenzyl)-2,4,6-trimethylbenzene di-(3,5-di-tert-butyl-4-hydroxybenzyl) sulfide 3,5-di-tert-butyl-4-hydroxybenzyl-mercapto-acetic acid isooctyl ester bis-(4-tert-butyl-3-hydroxy-2,6-dimethylbenzyl)dithiol terephthalate
1,3,5-tris-(3,5-di-tert-butyl-4-hydroxybenzyl)isocyanurate
1,3,5-tris-(4-tert-butyl-3-hydroxy-2,6-dimethylbenzyl) isocyanurate
3,5-di-tert-butyl-4-hydroxybenzyl-phosphoric acid dioctadecyl ester
3,5-di-tert-butyl-4-hydroxybenzyl-phosphoric acid monoethyl ester, calcium-salt
1.6. Acylaminophenols, for Example,
4-hydroxy-lauric acid anilide
4-hydroxy-stearic acid anilide
2,4-bis-octylmercapto-6-(3,5-tert-butyl-4-hydroxyanilino)-s-triazine octyl-N-(3,5-di-tert-butyl-4-hydroxyphenyl)-carbamate

1.7. Esters of β-(3,5-di-tert-butyl-4-hydroxyphenyl)-Propionic Acid with Monohydric or Polyhydric Alcohols, for Example,

| | |
|---|---|
| methanol | diethylene glycol |
| octadecanol | triethylene glycol |
| 1,6-hexanediol | pentaerythritol |
| neopentyl glycol | tris hydroxyethyl isocyanurate |
| thiodiethylene glycol | dihydroxyethyl oxalic acid diamide |
| triethanolamine | triisopropanolamine |

1.8. Esters of β-(5-tert-butyl-4-hydroxy-3-methylphenyl)-Propionic Acid with Monohydric or Polyhydric Alcohols, for Example,

| | |
|---|---|
| methanol | diethylene glycol |
| octadecanol | triethylene glycol |
| 1,6-hexanediol | pentaerythritol |
| neopentyl glycol | tris-hydroxyethyl isocyanurate |
| thiodiethylene glycol | di-hydroxyethyl oxalic acid diamide |
| triethanolamine | triisopropanolamine |

1.9. Amides of β-(3,5-di-tert-butyl-4-hydroxyphenyl)-Propionic Acid for Example, N,N'-di-(3,5-di-tert-butyl-4-hydroxyphenylpropionyl)-hexamethylenediamine
N,N'-di-(3,5-di-tert-butyl-4-hydroxyphenylpropionyl)-trimethylenediamine
N,N'-di-(3,5-di-tert-butyl-4-hydroxyphenylpropionyl)-hydrazine
1.10 Diarylamines, for Example,
diphenylamine, N-phenyl-1-naphthylamine, N-(4-tert-octylphenyl)-1-naphthylamine,
4,4'-di-tert-octyl-diphenylamine, reaction product of N-phenylbenzylamine and
2,4,4-trimethylpentene, reaction product of diphenylamine and 2,4,4-trimethylpentene, reaction product of N-phenyl-1-naphthylamine and 2,4,4-trimethylpentene.

2. UV Absorbers and Light Stabilizers 2.1. 2-(2'-Hydroxyphenyl)-benzotriazoles, for example, the 5'-methyl-,3',5'-di-tert-butyl-, 5'-tert-butyl-, 5'-(1,1,3,3-tetramethylbutyl)-, 5-chloro-3',5'-di-tert-butyl-, 5-chloro-3'-tert-butyl-5'-methyl-, 3'-sec-butyl-5'-tert-butyl-, 4'-octoxy, 3',5'-di-tert-amyl-, 3',5'-bis-(α,α-dimethylbenzyl), 3'-tert-butyl-5'-(2-(omega-hydroxy-octa-(ethyleneoxy)carbonyl-ethyl)-, 3'-dodecyl-5'-methyl-, and 3'-tert-butyl-5'-(2-octyloxycarbonyl)ethyl-, and dodecylated-5'-methyl derivatives.

2.2. 2-Hydroxy-benzophenones, for example, the 4-hydroxy-, 4-methoxy-, 4-octoxy, 4-decyloxy-, 4-dodecyloxy-, 4-benzyloxy, 4,2',4'-trihydroxy- and 2'-hydroxy-4,4'-dimethoxy derivatives.

2.3. Esters of optionally substituted benzoic acids for example, phenyl salicylate, 4-tert-butylphenyl salicylate, octylphenyl salicylate, dibenzoylresorcinol, bis-(4-tert-butylbenzoyl)-resorcinol, benzoylresorcinol, 3,5-di-tert-butyl-4-hydroxybenzoic acid 2,4-di-tert-butylphenyl ester and 3,5-di-tert-butyl-4-hydroxybenzoic acid hexadecyl ester.

2.4. Acrylates, for example, α-cyano-β,β-diphenylacrylic acid ethyl ester or isooctyl ester, α-carbomethoxy-cinnamic acid methyl ester, α-cyano-β-methyl-p-methoxy-cinnamic acid methyl ester or butyl ester, α-carbomethoxy-p-methoxy-cinnamic acid methyl ester, N-(β-carbomethoxy-β-cyanovinyl)-2-methyl-indoline.

2.5. Nickel compounds, for example, nickel complexes of 2,2'-thio-bis-[4-(1,1,3,3-tetramethylbutyl)-phenol], such as the 1:1 or 1:2 complex, optionally with additional ligands such as n-butylamine, triethanolamine or N-cyclohexyl-diethanolamine, nickel dibutyldithiocarbamate, nickel salts of 4-hydroxy-3,5-di-tert-butylbenzylphosphonic acid monoalkyl esters, such as of the methyl, ethyl or butyl ester, nickel complexes of ketoximes such as of 2-hydroxy-4-methyl-phenyl undecyl ketoxime, nickel complexes of 1-phenyl-4-lauroyl-5-hydroxy-pyrazole, optionally with additional ligands.

2.6. Sterically hindered amines, for example bis-(2,2,6,6-tetramethylpiperidyl) sebacate, bis-(1,2,2,6,6-pentamethylpiperidyl) sebacate, n-butyl-3,5-di-tert.butyl-4-hydroxybenzyl malonic acid bis-(1,2,2,6,6-pentanemethylpiperidyl)ester, condensation product of 1-hydroxyethyl-2,2,6,6-tetramethyl-4-hydroxypiperidine and succinic acid, condensation product of N,N'-(2,2,6,6-tetra-methylpiperidyl)-hexamethylenediamine and 4-tert-octylamino-2,6-dichloro-s-triazine, tris-(2,2,6,6-tetramethylpiperidyl)-nitrilotriacetate, tetrakis-(2,2,6,6-tetramethyl-4-piperidyl) 1,2,3,4-butanetetracarboxylate, 1,1' (1,2-ethanediyl)-bis-(3,3,5,5-tetramethylpiperazinone), bis (1-octyloxy-2,2,6,6-tetramethylpiperidin-4-yl) sebacate, the specific compounds listed in U.S. Pat. No. 4,831,134 and U.S. Pat. No. 5,204,473 and in copending application Ser. No. 09/257,711.

2.7. Oxalic acid diamides, for example, 4,4'-di-octyloxy-oxanilide, 2,2'-di-octyloxy-5,5'-di-tert-butyl-oxanilide, 2,2'-di-dodecyloxy-5,5'-di-tert-butyl-oxanilide, 2-ethoxy-2'-ethyl-oxanilide, N,N'-bis (3-dimethylaminopropyl)-oxalamide, 2-ethoxy-5-tert-butyl-2'-ethyloxanilide and its mixture with 2-ethoxy-2'-ethyl-5,4'-di-tert-butyloxanilide and mixtures of ortho- and para-methoxy- as well as of o- and p-ethoxy-disubstituted oxanilides.

2.8. Hydroxyphenyl-s-triazines, for example 2,6-bis-(2,4-dimethylphenyl)-4-(2-hydroxy-4-octyloxyphenyl)-s-triazine; 2,6-bis-(2,4-dimethylphenyl)-4-(2,4-dihydroxyphenyl)-s-triazine; 2,4-bis(2,4-dihydroxyphenyl)-6-(4-chlorophenyl)-s-triazine; 2,4-bis[2-hydroxy-4-(2-hydroxy-ethoxy)phenyl]-6-(4-chlorophenyl)-s-triazine; 2,4-bis[2-hydroxy-4-(2-hydroxy-4-(2-hydroxy-ethoxy)phenyl]-6-(2,4-dimethylphenyl)-s-triazine; 2,4-bis[2-hydroxy-4-(2-hydroxyethoxy)-phenyl]-6-(4-bromophenyl)-s-triazine; 2,4-bis[2-hydroxy-4-(2-acetoxyethoxy)phenyl]-6-(4-chloro-phenyl)-s-triazine, 2,4-bis(2,4-dihydroxyphenyl)-6-(2,4-dimethylphenyl)-s-triazine.

3. Metal deactivators, for example, N,N'-diphenyloxalic acid diamide, N-salicylal-N'-salicyloylhydrazine, N,N'-bis-salicyloylhydrazine, N,N'-bis-(3,5-di-tert-butyl-4-hydroxyphenylpropionyl)-hydrazine, 3-salicyloylamino-1,2,4-triazole, bis-benzylidene-oxalic acid dihydrazide.

4. Phosphites and phosphonites, for example, triphenyl phosphite, diphenylalkyl phosphites, phenyldialkyl phosphites, tri-(nonylphenyl) phosphite, trilauryl phosphite, trioctadecyl phosphite, di-stearyl-pentaerythritol diphosphite, tris-(2,4-di-tert-butylphenyl) phosphite, di-isodecyl-pentaerythritol diphosphite, di-(2,4,6-tri-tert-butylphenyl)-pentaerythritol diphosphite, di-(2,4-di-tert-butyl-6-methylphenyl)-pentaerythritol diphosphite, di-(2,4-di-tert-butylphenyl)pentaerythritol diphosphite, tristearyl-sorbitol triphosphite, tetrakis-(2,4-di-tert-butylphenyl) 4,4'-diphenylylenediphosphonite.

5. Compounds which destroy peroxide, for example, esters of β-thiodipropionic acid, for example the lauryl, stearyl, myristyl or tridecyl esters, mercapto-benzimidazole or the zinc salt of 2-mercaptobenzimidazole, zinc dibutyl-dithiocarbamate, dioctadecyl disulfide, pentaerythritol tetrakis-(β-dodecylmercapto)-propionate.

6. Hydroxylamines, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecyl-hydroxylamine, N-heptadecyl-N-octadecylhydroxylamine, N,N-dialkylhydroxylamine derived from hydrogenated tallow amine.

7. Nitrones, for example, N-benzyl-alpha-phenyl nitrone, N-ethyl-alpha-methyl nitrone, N-octyl-alpha-heptyl nitrone, N-lauryl-alpha-undecyl nitrone, N-tetradecyl-alpha-tridecyl nitrone, N-hexadecyl-alpha-pentadecyl nitrone, N-octadecyl-alpha-heptadecylnitrone, N-hexadecyl-alpha-heptadecyl nitrone, N-octadecyl-alpha-pentadecyl nitrone, N-heptadecyl-alpha-heptadecyl nitrone, N-octadecyl-alpha-hexadecyl nitrone, nitrone derived from N,N-dialkylhydroxylamine derived from hydrogenated tallow amine.

8. Polyamide stabilizers, for example copper salts in combination with iodides and/or phosphorus compounds and salts of divalent manganese.

9. Basic co-stabilizers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example Ca stearate, Zn stearate, Mg stearate, Na ricinoleate and K palmitate, antimony pyrocatecholate or zinc pyrocatecholate.

10. Nucleating agents, for example, 4-tert-butyl-benzoic acid, adipic acid, diphenylacetic acid.

11. Fillers and reinforcing agents, for example, calcium carbonate, silicates, glass fibers, asbestos, talc, kaolin, mica, barium sulfate, metal oxides and hydroxides, carbon black, graphite.

12. Other additives, for example, plasticizers, lubricants, emulsifiers, pigments, optical brighteners, flameproofing agents, anti-static agents, blowing agents and thiosynergists such as dilauryl thiodipropionate or distearyl thiodipropionate.

13. Benzofuranones and indolinones, for example those disclosed in U.S. Pat. No. 4,325,863, U.S. Pat. No. 4,338,244 or U.S. Pat. No. 5,175,312, or 3-[4-(2-acetoxyethoxy)phenyl]-5,7-di-tert-butyl-benzo-furan-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-di-methyl-4-pivaloyloxyphenyl)-5,7-di-tert-butyl-benzofuran-2-one.

The co-stabilizers, with the exception of the benzofuranones listed under 13, are added for example in concentrations of 0.01 to 10%, relative to the total weight of the material to be stabilized.

Further preferred compositions comprise, in addition to components (a) and (b) further additives, in particular phenolic antioxidants, light stabilizers or processing stabilizers.

Particularly preferred additives are phenolic antioxidants (item 1 of the list), sterically hindered amines (item 2.6 of the list), phosphites and phosphonites (item 4 of the list), UV absorbers (item 2 of the list) and peroxide-destroying compounds (item 5 of the list).

Additional additives (stabilizers) which are also particularly preferred are benzofuran-2-ones, such as described, for example, in U.S. Pat. No. 4,325,863, U.S. Pat. No. 4,338,244 or U.S. Pat. No. 5,175,312.

The phenolic antioxidant of particular interest is selected from the group consisting of n-octadecyl 3,5-di-tert-butyl-4-hydroxyhydrocinnamate, neopentanetetrayl tetrakis(3,5-di-tert-butyl-4-hydroxyhydrocinammate), di-n-octadecyl 3,5-di-tert-butyl-4-hydroxybenzylphosphonate, 1,3,5-tris(3,5-di-tert-butyl-4-hydroxybenzyl)isocyanurate, thiodiethylene bis(3,5-di-tert-butyl-4-hydroxyhydrocinnamate), 1,3,5-trimethyl-2,4,6-tris(3,5-di-tert-butyl-4-hydroxy-benzyl)benzene, 3,6-dioxaoctamethylene bis(3-methyl-5-tert-butyl-4-hydroxyhydrocinnamate), 2,6-di-tert-butyl-p-cresol, 2,2'-ethylidene-bis(4,6-di-tert-butylphenol), 1,3,5-tris(2,6-dimethyl-4-tert-butyl-3-hydroxybenzyl)isocynurate, 1,1,3,-tris(2-methyl-4-hydroxy-5-tert-butylphenyl)butane, 1,3,5-tris[2-(3,5-di-tert-butyl-4-hydroxyhydrocinnamoyloxy)ethyl]isocyanurate, 3,5-di-(3,5-di-tert-butyl-4-hydroxybenzyl)mesitol, hexamethylene bis(3,5-di-tert-butyl-4-hydroxyhydrocinnamate), 1-(3,5-di-tert-butyl-4-hydroxyanilino)-3,5-di(octylthio)-s-triazine, N,N'-hexamethylene-bis(3,5-di-tert-butyl-4-hydroxyhydrocinnamamide), calcium bis(ethyl 3,5-di-tert-butyl-4-hydroxybenzylphosphonate), ethylene bis[3,3-di(3-tert-butyl-4-hydroxyphenyl)butyrate], octyl 3,5-di-tert-butyl-4-hydroxybenzylmercaptoacetate, bis(3,5-di-tert-butyl-4-hydroxyhydrocinnamoyl)hydrazide, and N,N'-bis[2-(3,5-di-tert-butyl-4-hydroxyhydrocinnamoyloxy)-ethyl]-oxamide.

A most preferred phenolic antioxidant is neopentanetetrayl tetrakis(3,5-di-tert-butyl-4-hydroxyhydrocinnamate), n-octadecyl 3,5-di-tert-butyl-4-hydroxyhydrocinnamate, 1,3,5-tri-methyl-2,4,6-tris(3,5-di-tert-butyl-4-hydroxybenzyl)benzene, 1,3,5-tris(3,5-di-tert-butyl-4-hydroxybenzyl)isocyanurate, 2,6-di-tert-butyl-p-cresol or 2,2'-ethylidene-bis(4,6-di-tert-butylphenol).

The hindered amine compound of particular interest is selected from the group consisting of bis(2,2,6,6-tetramethylpiperidin-4-yl) sebacate, bis(1,2,2,6,6-pentamethylpiperidin-4-yl) sebacate, di(1,2,2,6,6-pentamethylpiperidin-4-yl) (3,5-di-tert-butyl-4-hydroxybenzyl)butylmalonate, 4-benzoyl-2,2,6,6-tetramethylpiperidine, 4-stearyloxy-2,2,6,6-tetramethylpiperidine, 3-n-octyl-7,7,9,9-tetramethyl-1,3,8-triaza-spiro[4.5]decane-2,4-dione, tris(2,2,6,6-tetramethylpiperidin-4-yl) nitrilotriacetate, 1,2-bis(2,2,6,6-tetramethyl-3-oxopiperazin-4-yl)ethane, 2,2,4,4-tetramethyl-7-oxa-3,20-diaza-21-oxodispiro[5.1.11.2]heneicosane, polycondensation product of 2,4-dichloro-6- tert-octylamino-s-triazine and 4,4'-hexamethylenebis (amino-2,2,6,6-tetramethylpiperidine), polycondensation product of 1-(2-hydroxyethyl)-2,2,6,6-tetramethyl-4-hydroxypiperidine and succinic acid, polycondensation product of 4,4'-hexamethylenebis-(amino-2,2,6,6-tetramethylpiperidine) and 1,2-dibromoethane, tetrakis(2,2, 6,6-tetramethylpiperidin-4-yl) 1,2,3,4-butanetetracarboxylate, tetrakis(1,2,2,6,6-pentamethylpiperidin-4-yl) 1,2,3,4-butanetetracarboxylate, polycondensation product of 2,4-dichloro-6-morpholino-s-triazine and 4,4'-hexamethylenebis(amino-2,2,6,6-tetramethylpiperidine), N,N',N'',N'''-tetrakis[(4,6-bis(butyl-1,2,2,6,6-pentamethyl-piperidin-4-yl)-amino-s-triazin-2-yl]-1,10-diamino-4,7-diazadecane, mixed [2,2,6,6-tetramethylpiperidin-4-yl/β,β,β',β'-tetramethyl-3,9-(2,4,8, 10-tetraoxaspiro[5.5]-undecane)diethyl]1,2,3,4-butanetetracarboxylate, mixed [1,2,2,6,6-pentamethylpiperidin-4-yl/β,β,β',β'-tetramethyl-3,9-(2,4,8, 10-tetraoxaspiro[5.5]-undecane)diethyl]1,2,3,4-butanetetracarboxylate, octamethylene bis(2,2,6,6-tetramethylpiperidin-4-carboxylate), 4,4'-ethylenebis(2,2,6, 6-tetramethylpiperazin-3-one), N-2,2,6,6-tetramethylpiperidin-4-yl-n-dodecylsuccinimide, N-1,2,2,6, 6-pentamethylpiperidin-4-yl-n-dodecylsuccinimide, N-1-acetyl-2,2,6,6-tetramethylpiperidin-4-yln-dodecylsuccinimide, 1-acetyl3-dodecyl-7,7,9,9-tetramethyl-1,3,8-triazaspiro[4.5]decane-2,4-dione, di-(1-octyloxy-2,2, 6,6-tetramethylpiperidin-4-yl) sebacate, di-(1-cyclohexyloxy-2,2,6,6-tetramethylpiperidin-4-yl) succinate, 1-octyloxy-2,2,6,6-tetramethyl-4-hydroxy-piperidine, poly-{[6-tert-octylamino-s-triazin-2,4-diyl][2-(1-cyclohexyloxy-2,2,6,6-tetramethylpiperidin-4-yl)imino-hexamethylene-[4-(1-cyclohexyloxy-2,2,6,6-tetramethylpiperidin-4-yl)imino], 2,4,6-tris[N-(1-cyclohexyloxy-2,2,6,6-tetramethylpiperidin-4-yl)-n-butylamino]-s-triazine, 2-(2-hydroxyethylamino)-4, 6-bis[N-butyl-N-(1-cyclohexyloxy-2,2,6,6-tetramethylpiperidin-4-yl)amino]-s-triazine, 1-(2-hydroxy-2-methylpropoxy)-4-octadecanoyloxy-2,2,6,6-tetramethylpiperidine; 1-(2-hydroxy-2-methylpropoxy)-4-hydroxy-2,2,6,6-tetramethylpiperidine; 1-(2-hydroxy-2-methylpropoxy)-4-oxo-2,2,6,6-tetramethylpiperidine; bis(1-(2-hydroxy-2-methylpropoxy)-2,2,6,6-tetramethylpiperidin-4-yl) sebacate; bis(1-(2-hydroxy-2-methylpropoxy)-2,2,6,6-tetramethylpiperidin-4-yl) adipate; bis(1-(2-hydroxy-2-methylpropoxy)-2,2,6,6-tetramethylpiperidin-4-yl) succinate; bis(1-(2-hydroxy-2-methylpropoxy)-2,2,6,6-tetramethylpiperidin-4-yl) glutarate; and 2,4-bis{N-[1-(2-hydroxy-2-methylpropoxy)-2,2, 6,6-tetramethylpiperidin-4-yl]-N-butyl-amino}-6-(2-hydroxyethylamino)-s-triazine.

A most preferred hindered amine compound is bis(2,2,6, 6-tetramethylpiperidin-4-yl) sebacate, bis(1,2,2,6,6-pentamethylpiperidin-4-yl) sebacate, di(1,2,2,6,6-pentamethylpiperidin-4-yl) (3,5-di-tert-butyl-4-hydroxybenzyl)butylmalonate, the polycondensation product of 1-(2-hydroxyethyl)-2,2,6,6-tetramethyl-4-hydroxypiperidine and succinic acid, the polycondensation product of 2,4-dichloro-6-tert-octylamino-s-triazine and 4,4'-hexamethylenebis(amino-2,2,6,6-tetramethylpiperidine), N,N',N'',N'''-tetrakis[(4,6-bis(butyl-(1,2,2,6,6-pentamethylpiperidin-4-yl)amino)-s-triazine-2-yl]-1,10-diamino-4,7-diazadecane. di-(1-octyloxy-2,2,6,6-tetramethylpiperidin-4-yl) sebacate, di-(1-cyclohexyloxy-2, 2,6,6-tetramethylpiperidin-4-yl) succinate, 1-octyloxy-2,2, 6,6-tetramethyl-4-hydroxy-piperidine, poly-{[6-tert-octylamino-s-triazin-2,4-diyl][2-(1-cyclohexyloxy-2,2,6,6-tetramethylpiperidin-4-yl)imino-hexamethylene-[4-(1-cyclohexyloxy-2,2,6,6-tetramethylpiperidin-4-yl)imino], 2,4,6-tris[N-(1-cyclohexyloxy-2,2,6,6-tetramethylpiperidin-4-yl)-n-butylamino]-s-triazine or 1-(2-hydroxy-2-methylpropoxy)-4-octadecanoyloxy-2,2,6,6-tetramethylpiperidine.

The instant composition can additionally contain another UV absorber selected from the group consisting of the benzotriazoles, s-triazines, the oxanilides, the hydroxybenzophenones, benzoates and the α-cyanoacrylates.

Particularly, the instant composition may additionally contain an effective stabilizing amount of at least one other 2-hydroxyphenyl-2H-benzotriazole; tris-aryl-s-triazine; or hindered amine or mixtures thereof.

Preferably, the 2-hydroxyphenyl-2H-benzotriazole is selected from the group consisting of 2-(2-hydroxy-3,5-di-tert-amylphenyl)-2H-benzotriazole;

2-[2-hydroxy-3,5-di(α,α-dimethylbenzyl)phenyl]-2H-benzotriazole;

2-[2-hydroxy-3-(α,α-dimethylbenzyl)-5-tert-octylphenyl]-2H-benzotriazole;

2-{2-hydroxy-3-tert-butyl-5-[2-(omega-hydroxy-octa (ethyleneoxy)carbonyl)ethyl]-phenyl}-2H-benzotriazole;

5-chloro-2-(2-hydroxy-3,5-di-tert-butylphenyl)-2H-benzotriazole;

5-chloro-2-(2-hydroxy-3-tert-butyl-5-methylphenyl)-2H-benzotriazole;

2-(2-hydroxy-5-tert-octylphenyl)-2H-benzotriazole; and

2-{2-hydroxy-3-tert-butyl-5-[2-(octyloxy)carbonyl) ethyl]phenyl}-2H- benzo-triazole.

Preferably, the other tris-aryl-s-triazine is selected from the group consisting of 2,4-bis(2,4-dimethylphenyl)-6-(2-hydroxy-4-octyloxyphenyl)-s-triazine;

2,4-diphenyl-6-(2-hydroxy-4-hexyloxyphenyl)-s-triazine;

2,4-bis(2,4-dimethylphenyl)-6-[2-hydroxy-4-(3-do-/tri-decyloxy-2-hydroxypropoxy)-phenyl]-s-triazine; and 2,4-bis(2,4-dimethylphenyl)-6-[2-hydroxy-4-(3-nonyloxy*-2-hydroxypropoxy)-5-α-cumylphenyl]-s-triazine (* denotes a mixture of octyloxy, nonyloxy and decyloxy groups).

The alkyd resin lacquers which can be stabilized against the action of light and moisture in accordance with the instant invention are the conventional stoving lacquers which are used in particular for coating automobiles (automobile finishing lacquers), for example lacquers based on alkyd/melamine resins and alkyd/acrylic/melamine resins (see H. Wagner and H. F. Sarx, "Lackkunstharze" (1977), pages 99–123). Other crosslinking agents include glycouril resins, blocked isocyanates or epoxy resins.

The lacquers stabilized in accordance with the invention are suitable both for metal finish coatings and solid shade finishes, especially in the case of retouching finishes, as well as various coil coating applications. The lacquers stabilized in accordance with the invention are preferably applied in the conventional manner by two methods, either by the single-coat method or by the two-coat method. In the latter method, the pigment-containing base coat is applied first and then a covering coat of clear lacquer over it.

It is also to be noted that the compounds of the present invention are applicable for use in non-acid catalyzed thermoset resins such as epoxy, epoxy-polyester, vinyl, alkyd, acrylic and polyester resins, optionally modified with silicon, isocyanates or isocyanurates. The epoxy and epoxy-polyester resins are crosslinked with conventional crosslinkers such as acids, acid anhydrides, amines and the like. Correspondingly, the epoxide may be utilized as the crosslinking agent for various acrylic or polyester resin systems that have been modified by the presence of reactive groups on the backbone structure.

When used in two-coat finishes, the compounds of the instant invention can be incorporated in the clear coat or both in the clear coat and in the pigmented base coat.

When water-soluble, water miscible or water dispersible coating are desired ammonium salts of acid groups present in the resin are formed. Powder coating composition can be prepared by reacting glycidyl methacrylate with selected alcohol components.

The instant benzotriazoles are made by conventional methods for preparing such compounds. The usual procedure involves the diazotization of a substituted o-nitroaniline followed by coupling the resultant diazonium salt with a substituted phenol and reduction of the azobenzene intermediate to the corresponding desired benzotriazole. The starting materials for these benzotriazoles are largely items of commerce or can be prepared by normal methods of organic synthesis.

While the instant benzotriazoles with their enhanced durability are particularly suited for automotive coating applications, it is contemplated that they will also be espeically useful in other applications where their enhanced durability is required such as in solar films and the like.

The following examples are for illustrative purposes only and are not to be construed to limit the instant invention in any manner whatsoever.

EXAMPLE 1

5-Trifluoromethyl-2-(2-hydroxy-3-(di-n-butyl-aminomethyl-5-tert-octylphenyl)-2H-benzotriazole 5-Trifluoromethyl-2-(2-hydroxy-5-tert-octylphenyl)-2H-benzotriazole (40.9 g, 0.104 mol), paraformaldehyde (3.65 g, 0.116 mol) and di-n-butylamine (28.2 g, 0.216 mol) are charged to a pressure reactor at ambient temperature. The reactor is sealed and the temperature is raied to 160° C. The reaction mass is held at 160° C. for four hours and then discharged. The reactor is rinsed with toluene. The toluene, amine and water are stripped by rotary evaporation. This crude Mannich product is chromatographed on silica gel using a heptane/ethyl acetate gradient as eluent to remove a trace of unreacted starting benzotriazole intermiediate. The title compound is obtained as a yellow oil in 93% yield after chormatography.

Analysis:
$^1$Hnmr (CDCl$_3$): δ 0.79 (s, 9H); 0.88 (t, 6H); 1.32 (m, 4H); 1.40 (s, 6H); 1.52 (m, 4H); 1.75 (s, 2H); 2.55 (t, 4H); 3.90 (s, 2H); 7.18 (d, 1H); 7.60 (dd, 1H); 7.68 (d, 1H); 8.13 (dd, 1H); 8.35 (d, 1H).

Mass spectrometry: m/z 533 (M+H).

EXAMPLE 2

Methylene-2-[4-tert-butyl-6-(5-phenylsulfonyl-2H-benzotriazol-2-yl)phenol]-2'-[4-tert-octyl-6-(5-trifluoromethyl-2H-benzotriazol-2-yl)phenol]

5-Phenylsulfonyl-2-(2-hydroxy-5-tert-butylphenyl)-2H-benzotriazole (6.8 g, 0.017 mol), sodium methoxide (0.99 g, 0.017 mol) and xylenes (20 g, 0.187 mol) are added to a reaction flask with is then heated to 160° C. The compound prepared in Example 1 (8.93 g, 0.0167 mol) dissolved in 8 g of xylenes is dripped into the reaction mass over a one-hour period. At the end of the addition, the reaction mass is heated to 205° C. while distilling off xylene, methanol and di-n-butylamine. After one hour at 205° C., the reaction mass is subjected to a 26" Hg vacuum for three hours, After the vacuum is released, the reaction mass is cooled to 100° C. and 50 g of xylenes are added. The solution is then washed with 25 g of 10% aqueous hydrochloric acid. After distilling off the solvent 15.5 g of crude product is obtained. This is chromatographed over silica gel using 15% ethyl acetate in heptane as eluent. The title compound is obtained as a solid in a yield of 6.6 g melting at 95–100° C.

Analysis:
$^1$Hnmr (CDCl$_3$): δ 0.72 (s, 9H); 1.35 (s, 9H); 1.42 (s, 6H); 1.76 (s, 2H); 4.31 (s, 2H); 7.44 (d, 2H); 7.55 (t, 2H); 7.61 (t, 1H); 7.68 (dd, 1H); 7.91 (dd, 1H); 8.03 (d, 2H); 8.04 (d, 1H); 8.08 (d, 1H); 8.31 (d, 1H); 8.32 (d, 2H);, 8.73 (d, 1H); 11.14 (s, 1H); 11.23 (s, 1H).
$^{19}$Fnmr (CDCl$_3$): −68.9 ppm.
Mass spectrometry: m/z 811 (M+H).

EXAMPLE 3

Methylene-2-[4-tert-butyl-6-(5-chloro-2H-benzotriazol-2-yl)phenol]-2'-[4-tert-octyl-6-(5-trifluoromethyl-2H-benzotriazol-2-yl)phenol]

Using the procedure of Example 2 with 4.5 g of 5-chloro-2-(2-hydroxy-5-tert-butylphenyl)-2H-benzotriazole instead of the 5-phenylsulfonyl-2-(2-hydroxy-5-tert-butyl-phenyl)-2H-benzotriazole and keeping the same molar ratios of the reactants the same, 8.67 g of the title compound is obtained having a melting point of 32–44° C.

Analysis:
$^1$Hnmr (CDCl$_3$): δ 0.73 (s, 9H); 1.36 (s, 9H); 1.42 (s, 6H); 1.76 (s, 2H); 4.31 (s, 2H); 7.40 (d, 1H); 7.43 (d, 1H); 7.44 (dd, 1H); 7.68 (dd, 1H); 7.89 (d, 1H); 7.94 (d, 1H); 8.08 (d, 1H); 8.29 (d, 1H); 8.32 (d, 2H); 11.23 (s, 1H); 11.29 (s, 1H).
$^{19}$Fnmr (CDCl$_3$): −68.9 ppm.
Mass spectrometry: m/z 705 (M+H).

EXAMPLE 4

Methylene-2-[4-tert-butyl-6-(5-phenylthio-2H-benzotriazol-2-yl)phenol]-2'-[4-tert-octyl-6-(5-trifluoromethyl-2H-benzotriazol-2-yl)phenol]

Using the procedure of Example 2 with 5.67 g of 5-phenylthio-2-(2-hydroxy-5-tert-butylphenyl)-2H-benzotriazole instead of the 5-phenylsulfonyl-2-(2-hydroxy-5-tert-butylphenyl)-2H-benzotriazole and keeping the same molar ratios of the reactants the same, 5.97 g of the title compound is obtained having a melting point of 49–65° C.

Analysis:
$^1$Hnmr (CDCl$_3$): δ 0.72 (s, 9H); 1.34 (s, 9H); 1.41 (s, 6H); 1.75 (s, 2H); 4.30 (s, 2H); 7.34–7.52 (m, 3H); 7.37 (d, 1H); 7.39 (dd, 1H); 7.43 (d, 1H); 7.50 (d, 2H); 7.68 (d, 1H); 7.73 (d, 1H); 7.84 (d, 1H); 8.08 (d, 1H); 8.26 (d, 1H); 8.31 (d, 1H); 8.32 (d, 1H); 11.20 (s, 1H); 11.36 (s, 1H).
$^{19}$Fnmr (CDCl$_3$): −68.9 ppm.
Mass spectrometry: m/z 779 (M+H).

EXAMPLE 5

2,2'-Methylene-bis[6-(5-phenylsulfonyl-2H-benzotriazol-2-yl)-4-tert-butylphenol]

5-Phenylsulfonyl-2-(2-hydroxy-5-tert-butylphenyl)-2H-benzotriazole (15 g, 0.037 mol), paraformaldehyde (0.63 g, 0.019 mol) and di-n-butylamine (5.0 g, 0.386 mol) are charged to a reactor which is then sealed. The temperature is increased to 110° C. at which time sodium methoxide (0.33 g, 0.0069 mol) is added. The reaction mixture is then heated to 205° C. and held there for three hours, The reaction mass is then cooled to 110° C. and 100 mL of xylenes are added. The reaction mass is neutralized with 10% aqueous hydrochloric acid and the organic phase is twice washed with water. The xylene phase is filtered through a plug of silica gel and is then distilled. The crude Mannich product is recrystallized twice from heptane to yield 8.3 g of the title compound having a melting point of 224–234° C.

Analysis:
$^1$Hnmr (CDCl$_3$): δ 1.40 (s, 18H); 4.30 (s, 2H); 7.50 (d, 2H); 7.55 (t, 4H); 7.61 (t, 4H); 7.91 (dd, 2H); 8.04 (m, 6H); 8.30 (d, 2H); 8.73 (d, 2H); 11.12 (s, 2H).

Mass spectrometry: m/z 827 (M+H).

EXAMPLE 6

Bisbenzotriazole Solubility in Adhesive

To measure the solubility of the instant bisbenzotriazole UV absorber in an adhesive composition, the compound is added to a typical adhesive GELVA® 263 (Solutia) which is a 44.5% solution of a polyacrylate in a mixture of ethyl acetate and hexane. The polyacrylate is a copolymer of methyl methacrylate, 2-ethylhexyl methacrylate and glycidyl methacrylate.

The test compound is dissolved in 5 mL of ethyl acetate, toluene or a mixture of ethyl acetate and toluene. To the solution is added 5 g of GELVA® 263. 2–3 mL of the resulting solution is place into individual watch glasses. Solubility is then evaluated based upon observed crystallization once the solvent has evaporated. Observations start after several hours and then continue over a period of several weeks.

The solubility values given in the table below are approximate maximum concentrations where no sign of subsequent crystallization is evident. Solubilities are reported in weight of total bisbenzotriazole added to GELVA® 263 as is. From these data, it is clear that some of the instant bisbenzotriazoles are considerably more soluble in adhesives, in this case GELVA® 263, than some bisbenzotriazoles of the prior art. The use of many UV absorbers in adhesive compositions has been limited in the past by the limited solubility and compatibility of some UV absorber compounds.

By using the selected instant bisbenzotriazoles, the use levels for the UV absorber can be raised substantially to add greatly to increased stabilization protection afforded by the instant compound. This is further augmented by the excellent photostability and red-shifted nature of the instant bisbenzotriazoles.

| Compound* | Trade Name or Class | Solubility without Crystallization (%) |
|---|---|---|
| A | bisbenzotriazole | 0.0 |
| B | TINUVIN ® 900 | 2.0 |
| C | TINUVIN ® 327 | 2.0 |
| D | bisbenzotriazole | 2.0 |
| E | bisbenzotriazole | 4.0 |
| F | bisbenzotriazole | 11.0 |
| G | bisbenzotriazole | 22.0 |
| H | bisbenzotriazole | 22.0 |

-continued

| Compound* | Trade Name or Class | Solubility without Crystallization (%) |
|---|---|---|

*A is comparative symmetrical bisbenzotriazole compound of Example 5, generically disclosed in German 1,670,951.
B is 2-(2-hydroxy-3,5-di-α-cumylphenyl)-2H-benzotriazole.
C is 5-chloro-2-(2-hydroxy-3,5-di-tert-butylphenyl)-2H-benzotriazole.
D is methylene-2-[4-tert-octyl-6-(2H-benzotriazol-2-yl)phenol]-2'-[4-tert-octyl-6-(5-trifluoromethyl-2H-benzotriazol-2-yl)phenol].
E is 2,2'-methylene-bis[6-(5-trifluoromethyl-2H-benzotriazol-2-yl)-4-tert-octylphenol].
F is instant asymmetrical bisbenzotriazole compound of Example 3.
G is instant asymmetrical bisbenzotriazole compound of Example 2.
H is instant asymmetrical bisbenzotriazole compound of Example 4.

B is 2-(2-hydroxy-3,5-di-α-cumylphenyl)-2H-benzotriazole.

C is 5-chloro-2-(2-hydroxy-3,5-di-tert-butylphenyl)-2H-benzotriazole.

D is methylene-2-[4-tert-octyl-6-(2H-benzotriazol-2-yl)phenol]-2'-[4-tert-octyl-6-(5-trifluoromethyl-2H-benzotriazol-2-yl)phenol].

E is 2,2'-methylene-bis[6-(5-trifluoromethyl-2H-benzotriazol-2-yl)-4-tert-octylphenol].

F is instant asymmetrical bisbenzotriazole compound of Example 3.

G is instant asymmetrical bisbenzotriazole compound of Example 2.

H is instant asymmetrical bisbenzotriazole compound of Example 4.

EXAMPLE 7

Methylene-2-[4-(2-methoxycarbonylethyl)-6-(5-chloro-2H-benzotriazol-2-yl)phenol]-2'-[4-tert-octyl-6-(5-trifluoromethyl-2H-benzotriazol-2-yl)phenol]

Following the general synthetic procedures outlined in Examples 1 and 2, or dislosed in EP 924,203 A1, the title compound is prepared.

EXAMPLES 8–30

Following the general synthetic procedures outlined in Examples 1 and 2, the following compounds of formula I are prepared.

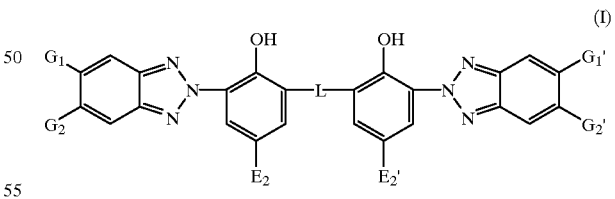

(I)

| Ex* | $G_2$ | $E_2$ | $E_2'$ | L | $G_3$ or $E_3$ |
|---|---|---|---|---|---|
| 8 | F | CH$_3$ | t-Bu | —CH$_2$— | — |
| 9 | F | t-Oc | t-Oc | —CH$_2$— | — |
| 10 | Cl | Do | CH$_3$ | m-Xy | — |
| 11 | Cl | t-Bu | t-Bu | —CH$_2$— | — |
| 12 | PO(Ph)$_2$ | Do | Do | —CH$_2$— | — |
| 13 | COOG$_3$ | Cu | Bu | p-Xy | CH$_3$ |
| 14 | COOG$_3$ | CH$_3$ | CH$_3$ | —CH$_2$— | Octad |
| 15 | COOG$_3$ | t-Oc | CH$_3$ | —CH$_2$— | Benz |
| 16 | CONHG$_3$ | C$_{24}$H$_{49}$ | Bu | —CH$_2$— | Bu |
| 17 | CON(G$_3$)$_2$ | Do | Hept | —CH$_2$— | Al |
| 18 | CN | t-Oc | t-Bu | —CH$_2$— | — |

(I)

[Structure: G₁, G₂ substituted benzotriazole—OH—L—OH—benzotriazole substituted with G₁', G₂'; with E₂ and E₂' substituents]

| Ex* | G₂ | E₂ | E₂' | L | G₃ or E₃ |
|---|---|---|---|---|---|
| 19 | CN | Cu | Do | —CH₂— | — |
| 20 | E₃SO | CH₃ | Cu | —CH₂— | Bu |
| 21 | E₃S | CH₃ | t-Bu | —CH₂— | Do |
| 22 | E₃SO₂ | MeOCOEt | t-Bu | —CH₂— | Ph |
| 23 | E₃SO₂ | MeOCOEt | MeOCOEt | —CH₂— | Oc |
| 24 | E₃SO₂ | t-Bu | t-Bu | —CH₂— | HOEt |
| 25 | Cl | AlOCOEt | CH₃ | —CH₂— | — |
| 26 | Cl | OcOCOEt | Oc | —CH₂— | — |
| 27 | Cl | AlOCOEt | AlOCOEt | —CH₂— | — |
| 28 | Cl | MeAcOEt | CH₃ | —CH₂— | — |
| 29 | Cl | Do | MeAcOEt | —CH₂— | — |
| 30 | Cl | HOPr | HOPr | —CH₂— | — |

*$G_1$ is always hydrogen except in Example 9 where it is F and in Examples 10–11 where it is Cl.
$G_1'$ is always hydrogen except in Example 11 where it is Cl.
$G_2'$ is always $CF_3$ except in Example 10 where it is $C_8F_{17}$ and in Example 11 where it is $C_2F_5$.

Al is allyl, AlOCOEt is $CH_2$=CH—$CH_2OCOCH_2CH_2$, Benz is benzyl, Bu is butyl, t-Bu is tert-butyl, Cu is α-cumyl, Do is dodecyl, Hept is heptyl, HOEt is $HOCH_2CH_2$, HOPr is $HOCH_2CH_2CH_2$, MeAcOEt is $CH_2$=$C(CH_3)COOCH_2CH_2$, MeOCOEt is $CH_3OCOCH_2CH_2$, Oc is octyl, t-Oc is tert-octyl, OcOCOEt is $C_8H_{17}OCOCH_2CH_2$, Octad is octadecyl, Ph is phenyl, m-Xy is α,α,α',α'-tetramethyl-m-xylylene and p-Xy is α,α,α',α'-tetramethyl-p-xylylene.

EXAMPLE 31

Polycarbonate

The durability of the instant benzotriazoles in thermoplastic substrates is determined by incorporating various test compounds into solvent cast films of polycarbonate resins. The free standing films are mounted into cardboard holders, secured in metal frames and exposed in an Atlas C165 Xenon-arc Weather-Ometer under dry conditions according to ASTM G26 for 1100 and 2200 hour exposure. Loss of UV absorber is determined by monitoring the loss of diagnostic UV absorption as described earlier. Performance is measured by a change in color or the physical integrity of the film.

Polycarbonate flake (LEXAN® 145, General Electric) is dissolved in methylene chloride at room temperature along with between 1 and 3% by weight of test benzotriazole, based on the polycarbonate. Films are cast using a calibrated drawdown bar to prepare 1 mil thick film after drying.

There is an increase in durability obtained with a benzotriazole substituted on the 5-position of the benzo ring with a trifluoromethyl moiety.

EXAMPLE 32

Pigmented Polyacetal

The following example shows an improvement in color protection of a pigmented polyacetal formulation for a bisbenzotriazole substituted on the 5-position of the benzo ring with a trifluoromethyl moiety.

The test additives are dry blended with polyacetal pellets (DELRIN® 500P NC010, DuPont) using a Turbula mixer. The dry blend is extruded and pelletized using a twin screw extruder at a melt temperature of about 410° F. (210° C.). The pellets are molded into test plaques (2"×2"×0.060") using an injection molder operated at 410–420° F. (204–216° C.). The plaques are exposed in a Xenon-arc Weather-Ometer according to automotive test procedure SAE J1885. Exposure is measured in terms of the total irradiation, measured in kilojoules per square meter ($kj/M^2$). Color change in the exposed samples is determined by measuring the color of the exposed samples compared to the unexposed samples as color difference (ΔE) according to ASTM D2244.

EXAMPLE 33

Poly(butylene terephthalate)

The following example illustrates the superior performance of a bisbenzotriazole substituted on the 5-position of the benzo ring with a trifluoromethyl group in protecting poly(butylene terephthalate) as measured by gloss retention.

The test additives are dry blended with poly(butylene terephthalate) pellets (VALOX® 315–1001, General Electric) using a Turbula mixer. The dry blends are extruded and pelletized using a twin screw extruder at 465–490° C. The pellets are molded into test plaques (2"×2"×0.060") using an injection molder operated at 475–515° F. (246–268° C.). The plaques are exposed in a Xenon arc Weather-Ometer according to ASTM G26 test method A. Gloss is measure at 600 on the unexposed and exposed samples using a glossmeter according to ASTM D523. Gloss retention %=(gloss exposed sample/gloss of unexposed sample)×100.

EXAMPLE 34

Polystyrene

Polystyrene films (crystalline polystyrene obtained from Chevron, free of zinc stearate and mineral oil) are solvent case from solutions in methylene chloride. These films are exposed to UV light as described in Example 31. The samples contain no hindered amine stabilizer and are monitored for color change after 1000 hours exposure, for loss of UV absorber and for physical integrity (cracking or catastrophic film failure).

EXAMPLE 35

Poly(methyl methacrylate)

The durability of the instant benzotriazoles in thermoplastic substrates is determined by incorporating various test compounds into solvent cast films of a poly(methyl methacrylate) resin. The free standing films are mounted into cardboard holders, secured in metal frames and exposed in an Atlas C165 Xenon-arc Weather-Ometer under dry conditions according to ASTM G26 for 1100 and 2200 hour exposure. Loss of UV absorber is determined by monitoring the loss of diagnostic UV absorption as described earlier. Performance is measured by a change in color or the physical integrity of the film, or in loss of absorbance of the UV absorber at λmax.

Poly(methyl methacrylate), medium molecular weight, Aldrich, is dissolved in methylene chloride at room temperature along with between 1 and 3% by weight of test benzotriazole, based on the PMMA resin. Films are cast using a calibrated drawdown bar to prepare 1 mil thick film after drying.

There is an increase in durability obtained with a bisbenzotriazole substituted on the 5-position of the benzo ring with a trifluoromethyl moiety.

EXAMPLE 36

Polyurethane

An acrylic polyol (RK 4037, DuPont) which is 75% solids in methyl amyl ketone is used in these experiments. The molecular weight is 7000–9000 and the OH number is 145. To 595 g of the acrylic polyol are added 26.2 g of butyl acetate, 5.8 g of ethyl acetate and 0.4 g of 50% strength FC 439 (flow control aid, 3M). Bis(1-octylocy-2,2,6,6-tetramethylpiperidin-4-yl) sebacate (0.75 g TINUVIN® 123, Ciba), 1% by weight based on resin solids, is added to the mixture. To 2.43 g of the above mixture is added 0.9 g of DESMODUR® N-3390 (Bayer), an aliphatic polyisocyanate, 90% solids. The UV absorber is incorporated into the acrylic polyol component. The polyurethane formed is applied as a coating onto a quartz disc by spin coating at 1000 rpm for two seconds. The wet coating is cured at 260° F. (127° C.) for 30 minutes.

UV spectra are collected using a λ-9 spectrophotometer from Perkin Elmer every half nm at 120 nm/min using a slit width of 2 nm.

Loss rates are measured from a 1.4 mil coating. The absorbance of the long wavelength UV absorbance band is around 2.3 before weathering. Weathering is done according to SAE J-1960 (exterior automotive weathering conditions): 0.55 watts/sq. in. at 340 nm using inner and outer borosilicate filters, 40' straight irradiance with no water spray; 20' light plus front spray; 60' light and 60' dark plus rear spray (condensation). Black panel temperature in light cycle is 70±2° C. and relative humidity of 50–55% in light cycle and 100% in dark cycle. The loss of long wavelength absorbance band is followed after approximately every 200 hours.

This test shows that the instant bisbenzotriazoles are especially durable in polyurethane films as judged by low loss rates.

EXAMPLE 37

Poly(vinyl chloride)

Poly(vinyl chloride) (PVC) films of GEON® 27 (Geon Co.) are solvent cast as described in Example 31 in warm tetrahydrofuran (THF) and then exposed in an Atlas C165 Weather-Ometer as described in Example 31.

This test shows that the instant bisbenzotriazoles are especially durable in PVC films as judged by low loss rates.

EXAMPLE 38

Coating Composition

A high solids thermoset acrylic clear coat is prepared by mixing an experimental acrylic polyol resin and hexamethoxymethylmelamine (Resimene® 747, Monsanto) at a solids ratio of 60/40. The dodecylbenzene sulfonic acid catalyst (Nacure® 5225; King Industries) is added at 0.70% by weight. A flow aid Modaflow® (Monsanto) is added at 0.25% by weight to form a model acrylic melamine resin system.

The model clear coat is reduced with xylene to a viscosity of 26–27 second using a Zahn #2 cup and applied via a conventional air spray at 50 psi (3.5 Kg/cm²) over a 1"×3" (2.54 cm×7.62 cm) quartz slide. Cure is achieved by baking the slide for 30 minutes at 260° F. (127° C.). The clear coat is stabilized with 1% by weight of a hindered amine light stabilizer, bis-(1-octyloxy-2,2,6,6-tetramethylpiperidin-4-yl) sebacate, (TINUVIN® 123, Ciba). The various test benzotriazole UV absorbers are incorporated at the 5 mmol % by weight in the clear coat. The film thickness on the quartz slides range from 1.15 to 1.41 mils (0.029 to 0.036 mm).

The films on the quartz slides are weathered according to the following conditions in Xenon Arc Weather-Ometer with a controlled irradiance at 6500 W, using inner quartz and outer borosilicate S-type filter. The irradiation cycle is as follows: 40 minutes of straight irradiation with no water spray, followed by 20 minutes of light plus front spray, followed by 60 minutes of light irradiation and finally by 60 minutes dart plus rear spray (condensation). The setting is at 0.55 W/M² at 340 nm, 1.98 kJ/hour. In the light cycle the black panel temperature is controlled at 70±2° C. The relative humidity in the light cycle is in the range of 50–55% and in the dark cycle 100%. The absorbance of the long wavelength UV band as a function of Xenon arc weathering hours are recorded.

To follow the loss of UV absorbers from the clear coats, UV spectra are measured initially and after weathering at regular time intervals. The UV spectrophotometer measures absorbance linearly up to 5.5 absorbance units using a reference beam attenuation technique.

It is assumed that the degradation products from the UV absorber do not contribute to the UV spectrum. This is tested by following the ratio of absorbance of the band at about 300 nm and the band at about 340 nm. The ratio does not change upon weathering the sample, This suggests that the UV spectrum of the weathered films correspond to the amount of UV absorber remaining in the film with very little if any contribution to the spectrum by photo degradants.

Representative bisbenzotriazole test compounds are incorporated into a high solid thermoset acrylic melamine resin at concentrations between 1.93 and 3% by weight to give equal molar concentrations of the test benzotriazole in equal film thickness and sufficient to give a starting absorbance of approximately 2.0 absorbance units. The test samples are exposed for 2000 hours.

The test shows that the instant bisbenzotriazoles are especially durable in automotive coatings as judged by low loss rates.

What is claimed is:

1. A compound of formula I

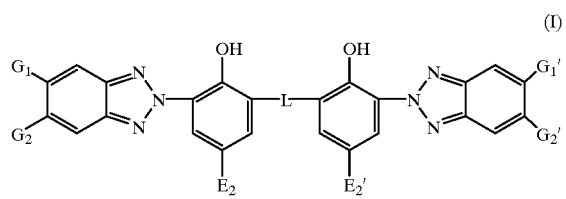

wherein
- $G_1$ and $G_1'$ are independently hydrogen or halogen;
- $G_2$ is halogen, nitro, cyano, —$COOG_3$, —$P(O)(C_6H_5)_2$, —CO—$G_3$, —CO—NH—$G_3$, —CO—N($G_3$)$_2$, —N($G_3$)—CO—$G_3$, $E_3$S—, $E_3$SO— or $E_3SO_2$—;
- $G_2'$ is perfluoroalkyl of 1 to 12 carbon atoms;
- $G_3$ is hydrogen, straight or branched chain alkyl of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 4 alkyl of 1 to 4 carbon atoms;

$E_2$ and $E_2'$ are independently straight or branched alkyl chain of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by one to three alkyl of 1 to 4 carbon atoms; or $E_2$ and $E_2'$ are independently said alkyl of 1 to 24 carbon atoms or said alkenyl of 2 to 18 carbon atoms substituted by one or more —OH, —OCOE$_{11}$, —OE$_4$, —NCO, —NH$_2$, —NHCOE$_{11}$, —NHE$_4$ or —N(E$_4$)$_2$, or mixtures thereof, where $E_4$ is straight or branched chain alkyl of 1 to 24 carbon atoms; or said alkyl or said alkenyl interrupted by one or more —O—, —NH— or —NE$_4$— groups or mixtures thereof and which is unsubstituted or substituted by one or more —OH, —OE$_4$ or —NH$_2$ groups or mixtures thereof; or $E_2$ and $E_2'$ are independently —(CH$_2$)$_m$—CO—E$_5$; or $E_2$ and $E_2'$ are independently a group of the formula

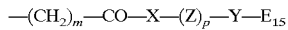

wherein $E_5$ is —OE$_6$ or —NE$_7$E$_8$, or $E_5$ is —PO(OE$_{12}$)$_2$, —OSi(E$_{11}$)$_3$ or —OCO—E$_{11}$, or straight or branched chain C$_1$–C$_{24}$alkyl which is interrupted by —O—, —S— or —NE$_{11}$ and which can be unsubstituted or substituted by —OH or —OCO—E$_{11}$, C$_5$–C$_{12}$ cycloalkyl which is unsubstituted or substituted by —OH, straight chain or branched C$_2$–C$_{18}$alkenyl which is unsubstituted or substituted by —OH, C$_7$–C$_{15}$aralkyl, —CH$_2$—CHOH—E$_{13}$ or glycidyl, $E_6$ is hydrogen, straight or branched chain C$_1$–C$_{24}$alkyl which is unsubstituted or substituted by one or more OH, OE$_4$ or NH$_2$ groups, or —OE$_6$ is —(OCH$_2$CH$_2$)$_w$OH or —(OCH$_2$CH$_2$)$_w$OE$_{21}$ where w is 1 to 12 and $E_{21}$ is alkyl of 1 to 12 carbon atoms, $E_7$ and $E_8$ are independently hydrogen, alkyl of 1 to 18 carbon atoms, straight or branched chain C$_3$–C$_{18}$alkyl which is interrupted by —O—, —S— or —NE$_{11}$—, C$_5$–C$_{12}$cycloalkyl, C$_6$–C$_{14}$aryl or C$_1$–C$_3$hydroxylalkyl, or $E_7$ and $E_8$ together with the N atom are a pyrrolidine, piperidine, piperazine or morpholine ring, X is —O— or —N(E$_{16}$)—, Y is —O— or —N(E$_{17}$)—, Z is C$_2$–C$_{12}$-alkylene, C$_4$–C$_{12}$-alkylene interrupted by one to three nitrogen atoms, oxygen atoms or a mixture thereof, or is C$_3$–C$_{12}$-alkylene, butenylene, butynylene, cyclohexylene or phenylene, each substituted by a hydroxyl group, m is zero, 1 or 2, p is 1, or p is also zero when X and Y are —N(E$_{16}$)— and —N(E$_{17}$)—, respectively, $E_{15}$ is a group —CO—C(E$_{18}$)=C(H)E$_{19}$ or, when Y is —N(E$_{17}$)—, forms together with E$_{17}$ a group —CO—CH=CH—CO—, wherein E$_{18}$ is hydrogen or methyl, and E$_{19}$ is hydrogen, methyl or —CO—X—E$_{20}$, wherein E$_{20}$ is hydrogen or C$_1$–C$_8$-alkyl;

$E_{16}$ and $E_{17}$ independently of one another are hydrogen, C$_1$–C$_{18}$-alkyl, C$_3$–C$_{12}$-alkyl interrupted by 1 to 3 oxygen atoms, or is cyclohexyl or C$_7$–C$_{15}$aralkyl, and E$_{16}$ together with E$_{17}$ in the case where Z is ethylene, also forms ethylene, $E_{11}$ is hydrogen, straight or branched chain C$_1$–C$_{18}$alkyl, C$_5$–C$_{12}$cycloalkyl, straight or branched chain C$_2$–C$_{18}$alkenyl, C$_6$–C$_{14}$aryl or C$_7$–C$_{15}$aralkyl;

$E_{12}$ is straight or branched chain C$_1$–C$_{18}$alkyl, straight or branched chain C$_3$–C$_{18}$alkenyl, C$_5$–C$_{10}$cycloalkyl, C$_6$–C$_{16}$aryl or C$_7$–C$_{15}$aralkyl;

$E_{13}$ is hydrogen, straight chain or branched C$_1$–C$_{18}$alkyl which is substituted by —PO(OE$_{12}$)$_2$, phenyl which is unsubstituted or substituted by OH, C$_7$–C$_{15}$aralkyl or —CH$_2$OE$_{12}$;

$E_3$ is alkyl of 1 to 20 carbon atoms, hydroxyalkyl of 2 to 20 carbon atoms, alkyl substituted by alkoxycarbonyl of 2 to 9 carbon atoms, alkenyl of 3 to 18 carbon atoms, cycloalkyl of 5 to 12 carbon atoms, phenylalkyl of 7 to 15 carbon atoms, aryl of 6 to 10 carbon atoms or said aryl substituted by one or two alkyl of 1 to 4 carbon atoms or 1,1,2,2-tetrahydroperfluoroalkyl where the perfluoroalkyl moiety is of 6 to 16 carbon atoms; and L is alkylene of 1 to 12 carbon atoms, alkylidene of 2 to 12 carbon atoms, benzylidene, p-xylylene, α,α,α',α'-tetramethyl-m-xylylene or cycloalkylidene.

2. A compound of formula I according to claim 1 wherein $G_1$ and $G_1'$ are each hydrogen, $G_2$ is chloro, phenylsulfonyl or phenylthio, $G_2'$ is CF$_3$, $E_2$ and $E_2'$ are independently straight or branched alkyl chain of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 3 alkyl of 1 to 4 carbon atoms; and L is alkylene of 1 to 12 carbon atoms, alkylidene of 2 to 12 carbon atoms, benzylidene, p-xylylene, α,α,α',α'-tetramethyl-m-xylylene or cycloalkylidene.

3. A compound of formula I according to claim 1 wherein $G_1$ and $G_1'$ are each hydrogen, $G_2$ is chloro, phenylsulfonyl or phenylthio, $G_2'$ is CF$_3$, $E_2$ and $E_2'$ are independently straight or branched alkyl chain of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 3 alkyl of 1 to 4 carbon atoms; and L is methylene.

4. The compound according to claim 1 which is (a) methylene-2-[4-tert-butyl-6-(5-phenylsulfonyl-2H-benzotriazol-2-yl)phenol]-2'-[4-tert-octyl-6-(5-trifluoromethyl-2H-benzotriazol-2-yl)phenol];

(b) methylene-2-[4-tert-butyl-6-(5-chloro-2H-benzotriazol-2-yl)phenol]-2'-[4-tert-octyl-6-(5-trifluoromethyl-2H-benzotriazol-2-yl)phenol]; or (c) methylene-2-[4-tert-butyl-6-(5-phenylthio-2H-benzotriazol-2-yl)phenol]-2'-[4-tert-octyl-6-(5-trifluoromethyl-2H-benzotriazol-2-yl)phenol].

\* \* \* \* \*